3,425,844
ULTRAVIOLET ABSORBING COMPOSITION
COMPRISING A FORMAZAN
Richard A. Flinn, Emmaus, Pa., Richard S. Sobell, Silver Spring, Md., and Andrew A. Swigar, Nesquehoning, and Robert A. Walde, Emmaus, Pa., assignors to Air Products and Chemicals, Inc., a corporation of Delaware
Filed July 9, 1965, Ser. No. 470,774
U.S. Cl. 99—150
Int. Cl. A21l *3/34;* C09k *3/00*
8 Claims

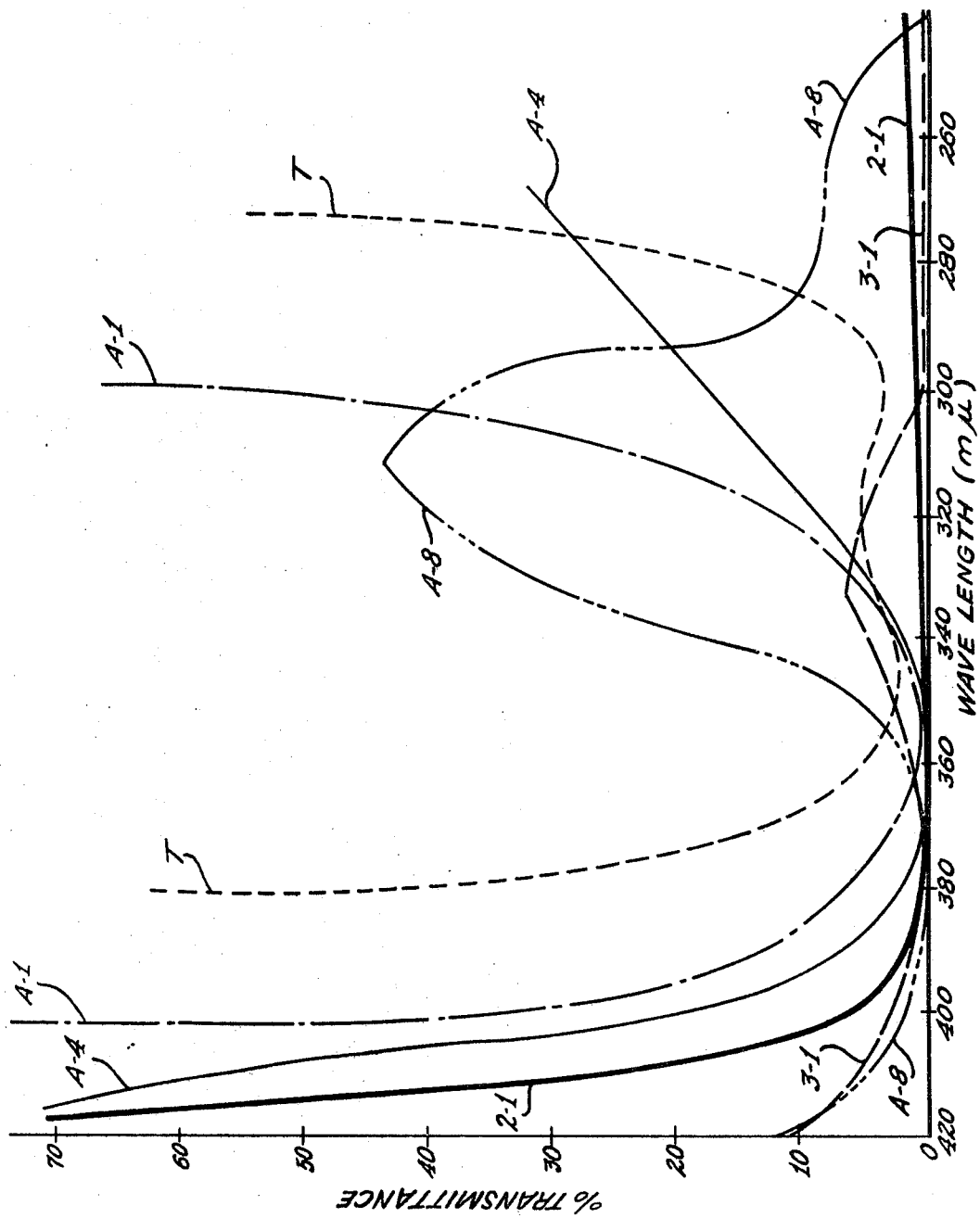

ABSTRACT OF THE DISCLOSURE

Certain formazan derivatives and metal chelates of bicyclononane dione esters, each used alone, is effective as an ultraviolet absorbing agent when incorporated into ultraviolet-sensitive polymer resins or plastic materials. The disclosed formazans are strongly absorptive in the wavelength range of about 325 to 400 m$\mu$, while the metal chelates of the bicyclononane dione esters are strongly absorptive in about the 250–320 m$\mu$ range. Mixtures of the two, however are operative over the broader range of from below 200 to above 420 m$\mu$. A composition comprising a lead chelate of bicyclononane dione tetracarboxylic ester and a formazan is an especially effective ultraviolet-protective agent for alkyd, vinyl, and urethane resin finishes.

---

The present invention relates to the protection of plastic and polymer resin materials against deterioration by ultraviolet radiation and to new chemicals effective as ultraviolet absorbing agents.

It has long been recognized that plastics and polymer resins, especially when deposited as coatings on wood or other solid materials, are subject to rapid deterioration upon exposure to ultraviolet (UV) light. Such deterioration is shown by loss of glossy finish, by checking or cracking of the coating, by color build-up and by blistering and loss of adhesion.

To combat such deterioration it is of common practice, particularly with respect to alkyd, vinyl and urethane finishes, to incorporate certain chemicals in minor amounts as ultraviolet screening or absorbing agents. Certain hydroxy-alkoxy benzophenones, hydroxyphenyl benzo-triazoles and substituted acrylonitriles have been recognized as effective in such use. One conversant with the structure of such compounds will discern that there is no simple or common element of functionality present. Accordingly one cannot predict the efficacy of new compounds as ultraviolet absorbents or as stabilizers against ultraviolet deterioration.

It has now been discovered that certain formazan derivatives, metal chelates or bicyclononanedione and their mixtures are highly effective ultraviolet absorbing agents when they are incorporated into ultraviolet sensitive polymer resins or plastic materials.

More specifically, it has been found that compounds of the described group are effective absorbers of ultraviolet light broadly in the range of from about 200 to 430 millimicrons (m$\mu$). The disclosed formazans are strongly absorptive in a wavelength range of 325 to about 400 m$\mu$, while metal chelates of 3,3,1-bicyclononane-2,6-dione-1,3,5,7-tetracarboxylic acid tetramethyl ester (BCN) are strongly absorptive in the wavelength range of 250 to about 320 m$\mu$. Surprisingly, it was discovered that a composition consisting of the lead chelate of bicyclononanedione tetracarboxylic ester and a formazan absorbed ultraviolet irradiation over even a broader wavelength range—from below 200 to above 420 m$\mu$—and was an especially effective protective agent for alkyd, vinyl, and urethane finishes.

A number of the ultraviolet absorbents herein described have been newly synthesized or prepared by a new technique.

The ultraviolet absorbing compounds characterized as formazans are members of a class more properly called phenylazomesmalonic acid derivatives. Generally, they are prepared from aniline or substituted anilines by diazotization and reaction of the diazonium salt with dimethyl malonate and, in some cases, converted further to acids, acyl halides and acid amides.

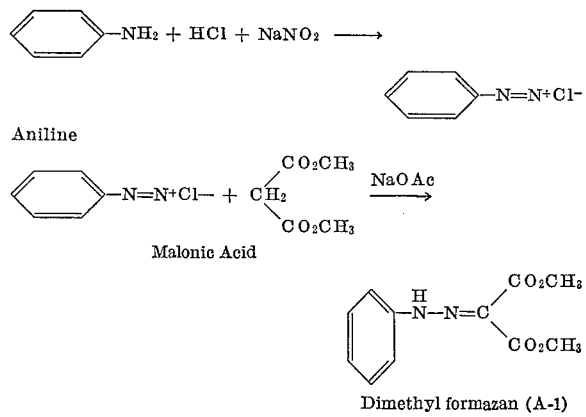

Dimethyl formazan (A-1)

EXAMPLE 1

Aniline diazonium salt was prepared in accordance with the above equation by first mixing 55.8 g. of aniline with 41.4 g. of 30% HCl. The aniline was poured directly into the HCl at room temperature and stirred. After a white precipitate had settled out, the hydrochloride was diluted with 400 cc. of $H_2O$. The solution was then cooled to 0° C. and the $NaNO_2$, dissolved in 150 cc. $H_2O$, was slowly added. The temperature of the diazonium solution was kept under 10° C. at all times.

80 g. of dimethylmalonate were placed in a 4-liter pot in an ice bath at 0° C. This was diluted with 400 cc. of methanol. The diazonium salt solution was then added to the methanol solution of dimethyl malonate, and a saturated solution of sodium acetate in $H_2O$ was slowly added to the mixture. Addition was continued until a slight cloudiness was seen in the reaction mixture. The mixture was then stirred frequently by hand, and the sodium acetate solution was added at intervals in 50–100 ml. quantities to keep the pH at 3–4. The reaction was allowed to run overnight with mixing at room temperature. The product (A–1) was recovered by filtration and air dried for a yield of 85%. The diester was further purified by washing with water to remove sodium acetate and unreacted diazonium salts. It was then recrystallized from methanol and dried.

Reaction time was generally from 20–24 hours. For a few runs the time was cut to 6–7 hours, however, yields at this shorter reaction time were reduced to about 60%.

Following the procedure of Example 1 typical syntheses were effected using aniline derivatives in place of aniline. No yields were taken except for p-chloroaniline which ranged from 87–97%.

EXAMPLE 1

Aniline+dimethyl malonate to A–1—dimethyl formazan

EXAMPLE 2 p-Chloro-aniline+dimethyl malonate to A–2—p-chlorodimethyl formazan

EXAMPLE 3 p-Bromo-aniline+dimethyl malonate to A–3—p-bromodimethyl formazan

EXAMPLE 4 p-Methyl-aniline+dimethyl malonate to A–4—p-methyl-dimethyl formazan

EXAMPLE 5 p-Nitro-aniline+dimethyl malonate to A–5—p-nitro-dimethyl formazan

EXAMPLE 6 p-Carboxy-aniline+dimethyl malonate to A–6—p-carboxy-dimethyl formazan

EXAMPLE 7 o-Carboxy-aniline+dimethyl malonate to A–7—o-carboxy-dimethyl formazan

Methyl esters of the formazans and formazan derivatives thus prepared have been converted to the corresponding acid compounds by saponification of the diester to the di-sodium salt and acidification with diluted hydrochloric acid. These acids are readily converted to other diesters, acid esters, diamides and substituted aryl diamides.

A number of formazan derivatives have been synthesized having substantial activity as ultraviolet absorbents. Aside from the formazans produced with substituted anilines as shown above, derivatives of the malonic acid moiety have been prepared coming within the scope of the generic formula—

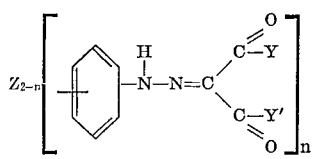

where $n$ is either 1 or 2, either Y or Y' (or both) is OH, Cl, Br, $OC_1$ to $OC_4$ alkyl, $OC_6H_5$, $NH_2$, NHR and RNR where R is either a $C_1$ to $C_4$ alkyl, phenyl, $C_6H_4NO_2$ or $C_6H_4Cl$ and where Z is H, a $C_1$ to $C_4$ alkyl, phenyl, carboxyl, Cl, Br or nitro substituent.

More specifically, synthesis of the acid halide and novel ultraviolet absorptive amides is described below:

EXAMPLE 8

Preparation of acid chloride

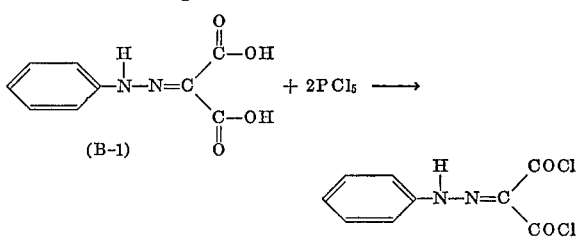

42 grams of $PCl_5$ were dissolved in dry $CHCl_3$ in a three-necked flask fitted with condenser and magnetic stirrer. 21 grams of B–1 were slowly added. With each addition, HCl was given off. A slight excess of $PCl_5$ was added to insure completion of the reaction. The $CHCl_3$ was distilled and the acid chloride recovered as a yellow crystalline solid melting at 136° C. Chlorine analysis showed it to contain 27.4% by weight; theoretical chlorine content was 29.7% by weight.

EXAMPLE 9

Preparation of phenylazomesmalonic phenyl ester

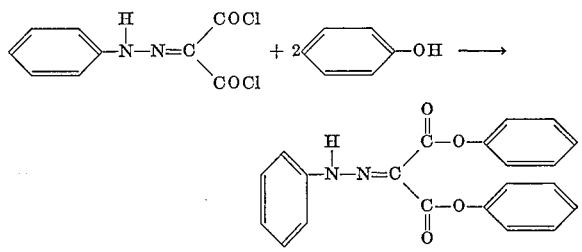

25 grams of the acid chloride from Example 8 were dissolved in 100 cc. of $CHCl_3$ and placed in a 250 cc. flask. 20 grams of phenol were added also dissolved in $CHCl_3$. The solvent was evaporated and a yellow crystalline solid recovered which melted at about 140° C.

EXAMPLE 10

Preparation of phenyl azo-mesmalonic anilide (A–8)

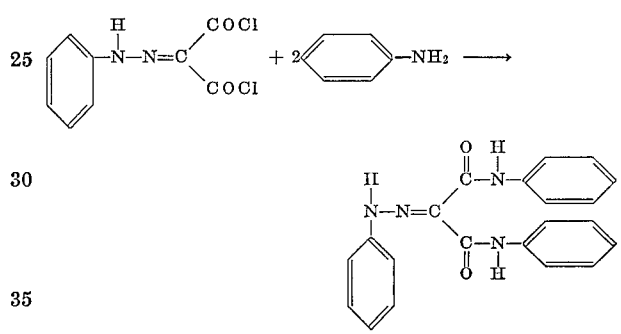

2.5 grams of the formazan acid chloride from Example 8 were placed in a 250 cc. round bottom flask and dissolved in 100 cc. of chloroform. 18.6 grams of aniline were added slowly. A vigorous reaction took place with the evolution of HCl. The reaction mixture after one-half hour of stirring was filtered and a bright yellow compound was recovered. The compound washed with 6 N base and then with 6 N HCl was found to be slightly soluble in $CHCl_3$. After recrystallization from chloroform its U.V. and IR spectra were determined and found to agree with the predicted structure. The compound melts at 172–174° C.

EXAMPLE 11

Preparation of phenyl azo-mesmalonic-para-nitro-anilide

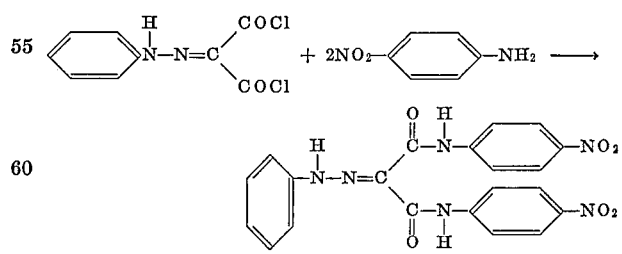

35 grams of the acid chloride prepared in accordance with Example 8 were dissolved in 25 cc. of $CHCl_3$ in a 250 ml. three-necked flask fitted with condenser and magnetic stirrer. To this was added 31 grams of p-nitroaniline also dissolved in $CHCl_3$. An exothermic reaction occurred and a precipitated product settled out after a few minutes. After filtering, the compound was purified by repeated crystallizations from $CHCl_3$. The compound was found to be slightly soluble in $CHCl_3$, had a light yellow color, yellow-green fluorescence and a melting point of 235° C. It decomposed at 300° C.

EXAMPLE 12

Preparation of p-chloro-dianilide

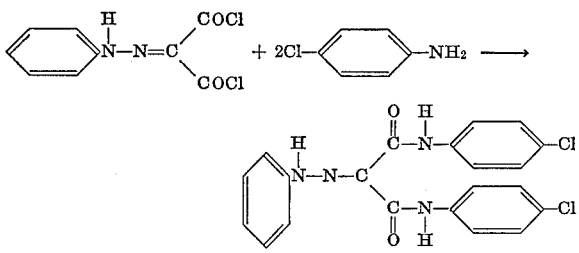

49 grams of the acid chloride prepared in accordance with Example 8 were dissolved in 100 cc. of dry $CHCl_3$ and placed in a 250 ml. flask fitted with a condenser. 52 grams of p-chloroaniline also dissolved in $CHCl_3$ were added to the flask. A yellow precipitate immediately settled out and more $CHCl_3$ was added so the mixture could be stirred. The reaction was allowed to mix at room temperature for 30 minutes and the precipitate recovered by filtration. The precipitate was then separated into a soluble and insoluble fraction by contact with boiling $CHCl_3$. The soluble fraction was recovered by evaporating the $CHCl_3$. It was a yellow crystalline solid melting at 175–180° C. Its identity was confirmed by the U.V. and IR spectra data.

The complementary stabilizing compounds, the metallo-organic derivatives of (BCN) and particularly the lead chelates of BCN, which have been found to be outstanding U.V. adsorbents and polymer stabilizers are prepared by reacting dimethyl malonate with an aqueous solution of formaldehyde (Formalin) and dimethyl amine in the presence of methanol.

$$CH_2O + (CH_3)_2NH + H_2C\begin{array}{c}COOCH_3\\ \\COOCH_3\end{array} \xrightarrow[\text{catalyst}]{\text{Methanol}}$$

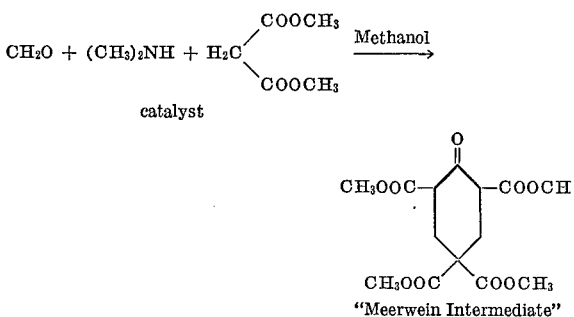

"Meerwein Intermediate"

The "Meerwein intermediate" is reacted with sodium in methanol, acidified and the product precipitated with added water to form:

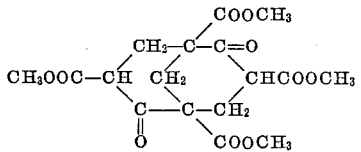

3,3,1-bicyclononane-2,6-dione-1,3,5,7-tetra carboxylic acid tetra methyl ester (BCN).

EXAMPLE 13

Step I 445 grams of 40% aqueous formaldehyde solution and 20 grams of dimethyl amine were poured into a flask and cooled to 0° C. 1.0 kg. of dimethyl malonate and 500 cc. of methyl alcohol were then added and the solution reacted at 0° C. for 12 hours. After reacting at 0° C., the temperature of the solution was allowed to rise to room temperature where it was held for 24 hours. It was then reacted at reflux temperature for 12 hours. Afterward, this solution was poured ino an equal volume of water and extracted once with ethyl ether. The ether extract was washed twice with 10% by weight sulfuric acid and twice with water. It was then dried over magnesium sulphate for approximately one day and over crushed non-indicating Dry Rite (calcium sulphate). After drying, the ether was evaporated and the product "Meerwein intermediate" distilled under vacuum to remove any unreacted materials. The pot temperature for the distillation was kept below 140° C. and the pressure held at 5 mm. Hg.

Step II

Sodium was dissolved in methyl alcohol, the "Meerwein intermediate" was added and the mixture refluxed at 65° C. for 8 to 17 hours. The material was then neutralized by adding Dry Ice until a pH of 7–8 was reached. At this point the material was gently warmed to approximately 10° C. and 600–1000 cc. of water were added in 100 cc. quantities. The precipitate formed was filtered and washed with water until the filtrate was clear. The material was then washed with a cold solution of 30 cc. of methyl alcohol and 300 cc. of water to remove oily deposits and again washed with water until the filtrate was clear. The yield was approximately 375–400 grams of a product melting at 130–150° C.

Step III 113 grams of the above product were poured into a solution of 28 grams of sodium hydroxide in 1900 cc. of water and reacted at room temperature for 25–35 minutes. It was then vacuum filtered to remove any foreign material. The filtrate was treated with Dry Ice until a pH of 7 to 8 was reached, filtered and then washed with water. Recovered BCN was oven dried below 100° C. The yield was approximately 45–50 grams of a product melting at 159–162° C.

BCN contains two keto groups and two adjacent active hydrogens which facilitate metal chelate formation. The chelation reaction has been carried out in both water and methanol using alkaline catalysts such as sodium methoxide, dimethyl amine, pyridine and pyrrolidine to produce chelates of the following structure:

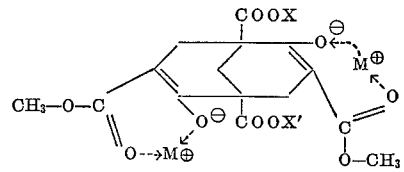

where M is a metal ion of a chelate-forming metal and X and X' are $C_1$ to $C_4$ alkyl groups. The chelation reaction is normally run at room temperature, but temperatures as high as 60° C. have been used. Some of the metal ions which have been successfully employed include: $Fe^{++}$, $Fe^{+++}$, $Cu^{++}$, $Ni^{++}$, $Zn^{++}$, $Pb^{++}$, $Sn^{++}$, $Cd^{++}$, $Al^{+++}$, $Bi^{++}$, $ZrO_2^{++}$, $Co^{++}$, $Hg^{++}$ and $Mn^{++}$. Considering the fact that the chelating molecule is di-functional, one would anticipate the formation of a polymeric structure when a di- or trivalent metal ion is complexed. Analysis of the various chelates for metal content has shown that, in general, the theoretical stoichiometry shown in the following table is obtained:

Molar Ratio of BCN to Metal Ion (M) Normally Resulting from a Chelation Reaction

| BCN⁻ | M⁺ | M⁺⁺ | M⁺⁺⁺ |
|---|---|---|---|
| 1 | 2 | | |
| 1 | | 1 | |
| 3 | | | 2 |

The fact that these metallo-organic chelates are polymeric gives them a low solubility. They are soluble in solvents such as benzene, chloroform and methanol in the range of 4–700 mg./100 cc. In effect, their selective solubility in organic solvents permits the metal chelates to be separated from the less active metals salts of BCN which can be formed by the hydrolysis of the two non-chelating carbomethoxy groups in the BCN molecule in the presence of metal ions under acidic conditions. The metal chelates will undergo decomposition at a pH of 2 to release metal ions. They undergo thermal decomposition in the range of 200–300° C. to produce nascent metal in an inert atmosphere and the metal oxide in air. They will also undergo exchange reactions and are reduced by aluminum alkyls and sodium borohydride.

EXAMPLE 14

BCN was dissolved in alcohol followed by addition of the metallic ions from an alcoholic solution and precipitation of the chelate by addition of pyrrolidine or diethyl amine to pH 8. A particular example of this procedure was the preparation of lead chelate in which 1.0 gram of BCN was dissolved in 30 cc. of methanol at its boiling point 2.0 grams of lead acetate·3H$_2$O dissolved in methanol were added (molar ratio of metal to BCN was 1.0/1.0) followed by pyrrolidine addition to pH 8. The material was filtered off hot, washed with methanol and dried in the oven at 95° C. 0.7 gram of a white solid was obtained having a lead content of 36.58% by weight; theoretically 35.05% by weight lead.

EXAMPLE 15

In a 2.1 beaker 20 g. of BCN were dissolved in 600 cc. of boiling methanol. Nitric acid was added dropwise until a pH of 2 was reached. 20 g. of lead acetate·3H$_2$O, dissolved in 300 cc. of methanol were then added and the pH adjusted to 8 by the addition of sodium methoxide. The white precipitate that formed was filtered at room temperature, washed with methanol and air dried overnight. 29.58 grams of a product analyzing at 36.94% by weight lead were obtained.

EXAMPLE 16

2.0 g. of BCN were dissolved in 60 cc. of hot (boiling) methanol and 0.4 g. of diethyl amine (DEA) was added.

The solution was mixed and 2.0 g. of lead acetate trihydrate dissolved in 20 cc. of methanol were added. Additional diethyl amine was added to a pH of 8.0. A white precipitate formed, was filtered, washed with methanol and distilled water and dried. 2.6 g. of a product containing 34% by weight lead were obtained.

EXAMPLE 17

The procedure of Example 16 was again followed with the exception that 0.8 g. of DEA and 4.0 g. of lead acetate trihydrate were used. 2.7 g. of a product containing 33% by weight lead were obtained.

The solution absorption properties of the product of this example are shown in the following table:

| Wavelength, mμ | Transmittance, percent |
|---|---|
| 320 | 7.8 |
| 310 | 1.8 |
| 300 | 0.4 |
| 290 | 0.0 |
| 280 | 0.0 |
| 270 | 0.0 |
| 260 | 0.0 |
| 250 | 1.2 |

Thus, the metal chelates constitute a hitherto unrecognized class of compounds having high U.V. absorption activity. Unexpectedly, a synergistic effect has also been found when they are used in combination with formazans as U.V. absorbers.

The first step in evaluating the aforementioned compounds as U.V. absorbers or antiweathering agents is to measure their solution absorption properties, e.g., by means of a Beckman DU spectrophotometer. The samples were dissolved in chloroform in a concentration range of 420 to 25 mg./l. and the percent transmittance measured over the wave length range of 400 to 250 mμ. Most commercial absorbers give effective filtering action in the range of 360 to 290 mμ. A comparison of typical formazans, BCN chelate-formazan combinations and commercial U.V. absorbers is shown in the drawing.

In this drawing, A–1 is dimethyl formazan at a concentration of 25 mg./l., A–4 is p-methyldimethyl formazan at a concentration of 25 mg./l., A–8 is formazan dianilide at a concentration of 25 mg./l., T is a commercial U.V. absorber having the formula

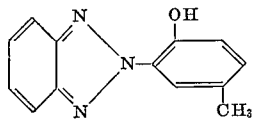

at a concentration of 25 mg/l., (2–1) is a mixture of A–1 and BCN lead chelate in the ratio of lead chelate to formazan of 12 to 1 at a concentration of 32.5 mg./l., (3–1) is a mixture of A–4, TE and BCN lead chelate at a concentration of 32.5 mg./l. In (3–1), A–4 and TE are present in equal amounts and the ratio of lead chelate to formazan is 12:1. TE is a formazan having the formula

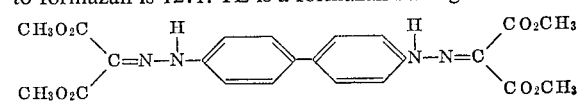

otherwise called tetramethyl diformazan.

From the drawing it can be seen that beyond the effective U.V. absorbing properties of formazans, the combination of lead chelates with various formazans gives a composition which absorbs ultra-violet over a substantially broader range of wave lengths. The ratio of the metal chelate to the formazan in such mixtures may vary from 0.01:1 to 12:1. Aside from the synergistic effect obtained with respect to U.V. absorption, other unexpected advantages also arise from the use of these two materials in combination. The lead chelate of BCN, for example, becomes more soluble and the yellow color characteristic of the monoformanzans is reduced. Such a combination is therefore especially effective in stabilizing clear finishes against ultra-violet deterioration.

Stabilizer compositions prepared for testing in coating formulations included a currently commercial U.V. absorbent as a reference material, formazans used alone and lead chelate of BCN used with varying quantities of one or more monoformazans. A description of the preparation of the multi-component absorbers is set forth in the following example.

EXAMPLE 18

The weighed ingredients shown were placed in a beaker to which CHCl$_3$ was added. The two large batches were agitated by mechanical mixers; the three small batches were agitated by hand, using a glass rod. The beaker was placed on a hot plate and upon mixing, the CHCl$_3$ boiled off to leave a very dense slurry. The remaining CHCl$_3$ was driven off using a nitrogen purge. The material was then placed in an oven at 45–50° C. to complete drying. The smaller batches were dried overnight, at room temperature.

| Prep. No. | Vol., CHCl$_3$ | Mixture Ratio Pb-BCN/Fmz.[1] | Pb-BCN | Weight Ratio A-1 | Weight Ratio A-4 | TE |
|---|---|---|---|---|---|---|
| 1 (3–1) | 1.2 l | 12/1 | 30 g | | 1.25 g | 1.25 g |
| 2 (2–1) | 2.1 l | 12/1 | 50 g | 4.2 | | |
| 3 ((2–1) | 100 ml | 6/1 | 1.0 g | 0.167 g | | |
| 4 (2–1) | 100 ml | 3/1 | 1.0 g | 0.333 g | | |
| 5 (2–1) | 100 ml | 1/1 | 0.6 g | 0.6 | | |

[1] Fmz.=Formazan.

Typical stabilizer compositions, as prepared, were tested in clear alkyd, vinyl, urthane and phenolic resin coatings at 1% concentration. White porcelain squares were coated with each material and these squares were then exposed 300 hours under ultraviolet irradiation using an U.V. (GE RS-4) lamp. The color buildup was measured on test and control sample films and the changes noted. The following table lists the composition tested and the results obtained:

COLOR BUILDUP IN CLEAR FINISH TESTS 300 HOUR U.V. EXPOSURE; APPLIED TO WHITE PORCELAIN SQUARES

| | Resin [1] | | | |
|---|---|---|---|---|
| | Alkyd | Vinyl | Urethane | Phenolic |
| Control (No Stabilizer): | | | | |
| Initial | .08 | .06 | .15 | .27 |
| Final | .21 | .27 | .34 | .41 |
| 1% Pb.BCN: | | | | |
| Initial | .07 | .03 | | |
| Final | .24 | .24 | | |
| 1% (3-1): | | | | |
| Initial | .09 | | | |
| Final | .17 | | | |
| 1% T: | | | | |
| Initial | .09 | .06 | .18 | .29 |
| Final | .18 | .23 | .35 | .43 |
| 1% (2-1): | | | | |
| Initial | .08 | .03 | .17 | .30 |
| Final | .18 | .13 | .34 | .43 |
| 1% A-1 or A-2: | | | | |
| Initial | | .03 | .22 | |
| Final | | .18 | .35 | |

[1] Alkyd Duraplex C 49, medium castor oil modified alkyd 33% phthalate, 54% castor oil; Vinyl Polyvinyl acetate-chloride copolymer, 87% VC, 13% VA dispersed in an aromatic-ketone solvent blend; Urethane F77, exterior, linseed oil modified polymer; Phenolic Phenol formaldehyde resin MIL-V-174A, china wood linseed oil phenolic 25% oil/100 resin.

As seen in the above table, alkyd and vinyl resins were inhibited against color buildup with 1% of stabilizer in the following order of decreasing effectiveness:
(1) Lead chelate—formazans
(2) Reference commercial stabilizer (T)
(3) Control (no stabilizer)
Urethane resin stabilization was in the following order of decreasing effectiveness:
(1) Formazan, A-1 or A-2
(2) Lead chelate-formazan (2-1)
(3) Reference commercial stabilizer (T)
(4) Control (no stabilizer)

In these tests the lead-BCN chelate-formazan combination was shown to be superior to the reference commercial stabilizer in each case and in two cases (with vinyl and urethane resins) the formazan esters alone were superior to the reference commercial material.

In the above series of tests, lead chelates and formazans were used in the ratio of 12 parts of the chelate to 1 part of the formazan ester. In the following tests lower ratios were used to as low as 5 parts of lead chelate for 100 parts of formazan ester.

CLEAR FINISH TESTS [1] AFTER U.V. EXPOSURE 400 HR. 1% ABSORBER IN ALKYD RESIN

| U.V. Absorber | Pb-BCN/ A-1 Ratio | 1 Gloss Retn., Percent | 2 Checking | 3 Cracking | 4 Color | 5 Adhesion |
|---|---|---|---|---|---|---|
| T | | 61 | 8 | 10 | 8 | |
| 2-1 | 1:1 | 64 | 8 | 10 | 7 | |
| 2-1 | 0.25:1 | 64 | 8 | 10 | 8 | |
| 2-1 | 0.05:1 | 67 | 8 | 10 | 8 | |
| After 500 Hr., 1% Absorber in Alkyd Resin | | | | | | |
| T | | 52 | | | 6 | 8 |
| 2-1 | 1:1 | 55 | | | 7 | 9+ |
| 2-1 | 0.25:1 | 53 | | | | 9+ |
| 2-1 | 0.05:1 | 58 | | | | 10 |

[1] Gloss, measured using a reflectance meter. The gloss of the unexposed sample is measured and given a meter rating of 100. The gloss of the exposed sample is then measured at the same instrument adjustment and given the value indicated by the meter reading. The value given is approximately the percent of original gloss retained and is reported as a value of 0 to 100%; Checking, small *surface* ruptures of the film; Cracking, similar to checking but film has ruptured through the surface support; Loss of Adhesion, localized peeling of the film from the surface of the support. Loss of adhesion is also evidenced by blistering, the formation of little bubbles under the surface of the film.

Observations 2 to 5 are made on a visual-comparative basis and are graded by assigning a numerical value of 1 to 10. (The value 10 indicates no change.)

Thus, a small amount of the lead chelate of BCN will act as a synergist to improve the stabilizing effect of the formazans. Over the concentration range shown, both at 400 and 500 hours of U.V. exposure, the lead chelate-formazan composition was superior to a current commercial stabilizer in gloss retention. Checking and cracking inhibition were in general at least equal to those of a current commercial polymer stabilizer.

Adhesion ratings after 500 hours of irradiation were, as shown above, in the order of:

Adhesion rating
(2-1) .05 Pb-BCN/1.0 A-1 _____ 10 (perfect).
(2-1) .025 to 1.0 Pb-BCN/1.0 A-1. 9+ (excellent).
Reference commercial stabilizer (T) 8 (notably poorer).

In this important criterion, the lead chelate-formazan compositions were superior to the reference commercial stabilizer, especially with lesser amounts of Pb-BCN chelate present.

After 1070 hours of U.V. irradiation, the stabilizers were rated as follows in urethane resin clear finishes using 3% stabilizer:

| | Percent Gloss Retention | Checking | Cracking | Color Buildup | Adhesion |
|---|---|---|---|---|---|
| (2-1) 1.0 Pb-BCN/1.0 A-1 | 78 | 10 | 10 | 6 | 10 |
| T, Reference Commercial Stabilizer | 69 | 10 | 10 | 7 | 8 |
| Control (No Stabilizer) | 62 | 10 | 10 | 6 | 7 |

Again the marked superiority of the lead-BCN chelate-formazan combination as a polymer stabilizer can be seen, particularly in gloss retention and adhesion.

The aforementioned formazans and metal-BCN chelate-formazan mixtures may be dissolved in solvents such as dichloroethylene, ethyl acetate, benzene and dimethyl formamide. Solutions thereby obtained may be applied as stabilizer coatings on polymer resins or may be incorporated into the polymer resins by blending, etc.

Materials sensitive to ultraviolet other than polymer resins can be effectively protected from U.V. attack by incorporating from 5 to 50 parts of the disclosed stabilizer composition per 1000 parts of material. Various U.V.-sensitive materials are effectively stabilized by compositions of the type here disclosed including urethane, alkyd, phenolic, vinyl chloride, vinyl acetate, polyacrylic, polyolefin, polyamide, and similar resins, as homopolymers and copolymers. Other U.V.-sensitive formulations including paint compositions, cosmetic compositions, sun tan shielding compositions, resin-impregnated fabrics and paper, light-sensitive oils and waxes, aqueous and organic solutions of fruit and food extracts, etc., are also effectively protected by such stabilizing agents.

Obviously, many modifications and variations of the invention as hereinbefore set forth may be made without departing from the spirit and scope thereof, and therefore only such limitations should be imposed as are indicated in the appended claims.

What is claimed is:

1. A composition containing a major amount of a material of the group consisting of food extracts, oil, wax, polymeric resins, and mixtures thereof, said composition containing therein at least about 1% of an ultraviolet absorbing compound selected from the group consisting of A and mixtures of A and B, wherein A is at least one formazan compound having one of the formulae:

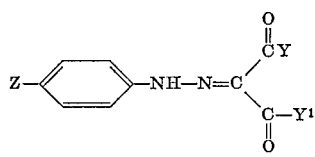

and

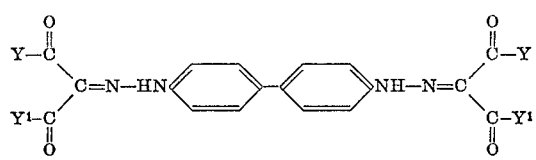

wherein Z is selected from the group consisting of H, Cl, Br, carboxyl, nitro, and $C_1$ to $C_4$ alkyl; Y and $Y^1$ are selected from the group consisting of OH, Cl, Br, $OC_1$ to $OC_4$ alkyl, $OC_6H_5$, $NH_2$, $N(phenyl)_2$, NH phenyl, $NHC_6H_4NO_2$, and $NHC_6H_4Cl$; and B is a lead chelate of the bicyclononane dione ester of the formula

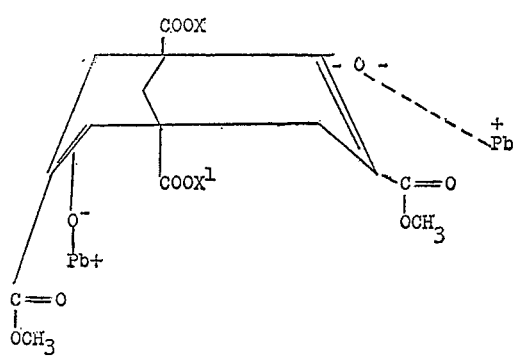

where X and $X^1$ are independently selected from the group consisting of alkyl radicals of 1 to 4 carbon atoms.

2. A composition according to claim 1 wherein the formazan is dimethyl formazan.

3. A composition according to claim 1 wherein the formazan is p-methyl dimethyl formazan.

4. A composition according to claim 1 wherein the formazan is formazan dianilide.

5. A composition according to claim 1 wherein the formazan is tetramethyl diformazan.

6. A composition according to claim 1 comprising an admixture of dimethyl formazan and B.

7. A composition resistant to deterioration by ultraviolet irradiation containing a predominant amount of materials from the group consisting of food extracts, oils, waxes, alkyd resins, vinyl resins, urethane resins, and phenolic resins, said composition containing at least about 1% by weight of at least one U.V. adsorbing agent selected from the group consisting of A and mixtures of A and B wherein A is at least one formazan compound having one of the formulae:

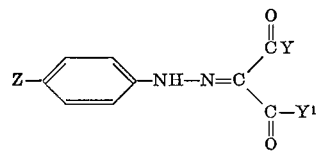

and

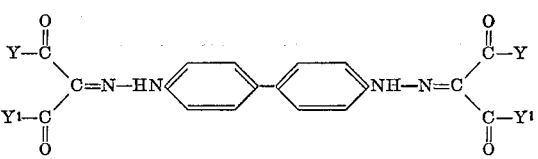

wherein Z is selected from the group consisting of H, Cl, Br, carboxyl, nitro, and $C_1$ to $C_4$ alkyl; Y and $Y^1$ are selected from the group consisting of OH, Cl, Br, $OC_1$ to $OC_4$ alkyl, $OC_6H_5$, $NH_2$, $N(phenyl)_2$, NH phenyl, $NHC_6H_4NO_2$, and $NHC_6H_4Cl$; and B is a lead chelate of the bicyclononane dione ester of the formula

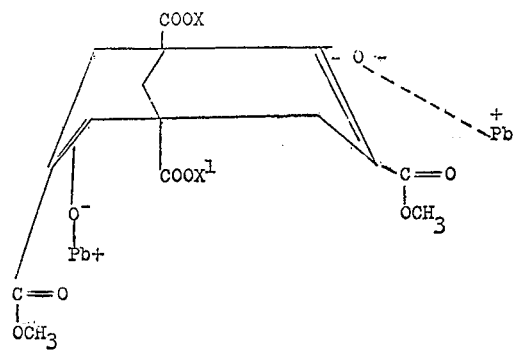

where X and $X^1$ are independently selected from the group consisting of alkyl radicals of 1 to 4 carbon atoms.

8. An ultraviolet absorbing composition comprising an admixture of p-methyl dimethyl formazan, tetramethyl diformazan and the lead chelate of bicyclononane dione ester.

References Cited

UNITED STATES PATENTS

| | | | |
|---|---|---|---|
| 3,117,104 | 1/1964 | Brown et al. | 260—45.9 |
| 3,211,562 | 10/1965 | Biland et al. | 260—45.9 |
| 3,216,969 | 11/1965 | Cyba | 260—45.9 |
| 3,243,459 | 3/1966 | O'Shea | 260—45.9 |
| 3,258,489 | 6/1966 | Mullins | 260—45.9 |
| 3,324,077 | 6/1967 | Bloom et al. | 260—45.75 |
| 3,325,448 | 6/1967 | Tanaka et al. | 260—45.75 |
| 1,511,874 | 10/1924 | Eder | 167—90 |
| 1,644,003 | 10/1927 | Wagner et al. | 260—193 |
| 1,851,097 | 3/1932 | Hentrich et al. | 260—176 |
| 2,807,609 | 9/1957 | Danuser et al. | 260—176 |
| 3,275,520 | 9/1966 | Strobel et al. | 167—90 |

DONALD E. CZAJA, Primary Examiner.

R. W. GRIFFIN, Assistant Examiner.

U.S. Cl. X.R.

424—59, 60; 260—45.75, 45.8, 45.9, 176, 193, 398.5, 429, 429.3, 29.7, 29.9, 431, 435, 438.1, 439, 447, 448; 106—263, 270; 117—155; 252—403, 407

UNITED STATES PATENT OFFICE
CERTIFICATE OF CORRECTION

Patent No. 3,425,844                          February 4, 1969

Richard A. Flinn et al.

It is certified that error appears in the above identified patent and that said Letters Patent are hereby corrected as shown below:

Column 1, line 55, "or" should read -- of --. Column 5, lines 40 to 47, the portion of the formula reading "COOCH" should read -- $COOCH_3$ --. Columns 7 and 8, in the table, fifth column, line 2 thereof, "4.2" should read -- 4.2g --; same table, same column, line 5 thereof, "0.6" should read -- 0.6g --. Column 9, "urthane" should read -- urethane --; line 28, "composition" should read -- compositions --.

Signed and sealed this 24th day of March 1970.

(SEAL)

Attest:

Edward M. Fletcher, Jr.

Attesting Officer

WILLIAM E. SCHUYLER, JR.

Commissioner of Patents